United States Patent [19]

Dick

[11] 4,407,995

[45] Oct. 4, 1983

[54] STABILIZED POLYCARBONATE COMPOSITIONS CONTAINING CYCLIC CARBONATES AND ORGANOPHOSPHOROUS COMPOUNDS

[75] Inventor: Kevin F. Dick, Lake Jackson, Tex.

[73] Assignee: The Dow Chemical Company, Midland, Mich.

[21] Appl. No.: 402,497

[22] Filed: Jul. 28, 1982

[51] Int. Cl.$^3$ ........................... C08K 5/15; C08K 5/52; C08K 5/53

[52] U.S. Cl. ..................................... 524/108; 524/126; 524/133; 524/135; 524/147; 524/151

[58] Field of Search ............... 524/108, 126, 133, 135, 524/147, 151

[56] References Cited

U.S. PATENT DOCUMENTS

| | | | |
|---|---|---|---|
| 3,287,316 | 11/1966 | Falkai et al. ....................... | 524/108 |
| 3,305,520 | 2/1967 | Fritz et al. .......................... | 524/151 |
| 3,558,554 | 1/1971 | Kuriyama et al. ................. | 524/151 |
| 3,578,623 | 5/1971 | Weissermel et al. .............. | 524/108 |
| 3,794,629 | 2/1974 | Elmers et al. ...................... | 524/109 |
| 4,075,163 | 2/1978 | Hofer et al. ........................ | 524/126 |
| 4,077,940 | 3/1978 | Wedel ................................. | 524/126 |
| 4,088,709 | 5/1978 | Seymour et al. .................. | 524/151 |
| 4,098,751 | 7/1978 | Mark et al. ......................... | 524/281 |
| 4,221,728 | 9/1980 | Jaquiss et al. ...................... | 524/151 |

Primary Examiner—John Kight, III
Assistant Examiner—R. A. White
Attorney, Agent, or Firm—B. G. Colley

[57] ABSTRACT

Polycarbonates are heat stabilized by the incorporation of a carbonate compound having a boiling point greater than about 250° C. and an organophosphorous compound such as a phosphonite or a phosphite. The amount of the additive compound used in each instance is from 100 to 10,000 parts per million.

9 Claims, No Drawings

STABILIZED POLYCARBONATE COMPOSITIONS CONTAINING CYCLIC CARBONATES AND ORGANOPHOSPHOROUS COMPOUNDS

BACKGROUND OF THE INVENTION

This invention relates to heat stabilized aromatic polycarbonate compositions which are resistant to yellowing during heating due to the incorporation of cyclic carbonates or 1,2-carbonate compounds and organophosphorous compounds.

It is known from U.S. Pat. No. 3,888,817 dated June 10, 1975 that polyester resins can be stabilized against the loss of molecular weight by adding a cyclic carbonate and an antioxidant such as a phenol, phosphite or an amine. However, the reference does not suggest the application of these cyclic carbonates to polycarbonate resin nor does it indicate any reduction in the yellowing of the resins.

It is known from U.S. Pat. Nos. 4,066,611 and 4,076,686 that polycarbonates can be heat stabilized with additives which include epoxy compounds.

It is also known from Ser. No. 370,698, filed Apr. 22, 1982 that polycarbonate resins can be heat stabilized by the addition of cyclic carbonates or 2-keto-1,3-dioxolane compounds. The compositions of the instant invention are rendered more heat stable by the incorporation of organophosphorous compounds.

SUMMARY OF THE INVENTION

It now has been found that aromatic polycarbonates can be heat stabilized and made resistant to yellowing by blending the polycarbonates with a carbonate compound having a boiling point greater than about 250° C. and an organophosphorous compound.

The amount of the carbonate compound used herein can range from 100 to 10,000 parts per million with the preferred amount being 500 to 3,000 parts per million. The amount of the organophosphorous compound used herein can range from 100 to 10,000 ppm and is preferably in the range from 500 to 3000 ppm.

DETAILED DESCRIPTION OF THE INVENTION

The aromatic polycarbonates that are useful in this invention are made from dihydroxy compounds having the following general formula:

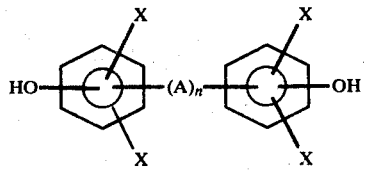

wherein A is a divalent hydrocarbon radical containing 1–15 carbon atoms,

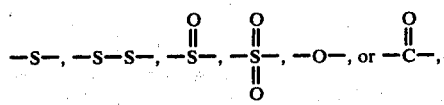

X is independently hydrogen, chlorine, bromine, fluorine, or a monovalent hydrocarbon radical such as an alkyl group of 1–4 carbons, an aryl group of 6–8 carbons such as phenyl, tolyl, xylyl, an oxylalkyl group of 1–4 carbons or an oxyaryl group of 6–8 carbons and n is 0 or 1.

One group of suitable dihydric aromatic compounds are those illustrated below:
1,1-bis(4-hydroxyphenyl)-1-phenyl ethane
1,1-bis(4-hydroxyphenyl)-1,1-diphenyl methane
1,1-bis(4-hydroxyphenyl)cyclooctane
1,1-bis(4-hydroxyphenyl)cycloheptane
1,1-bis(4-hydroxyphenyl)cyclohexane
1,1-bis(4-hydroxyphenyl)cyclopentane
2,2-bis(3-propyl-4-hydroxyphenyl)decane
2,2-bis(3,5-dibromo-4-hydroxyphenyl)nonane
2,2-bis(3,5-isopropyl-4-hydroxyphenyl)nonane
2,2-bis(3-ethyl-4-hydroxyphenyl)octane
4,4-bis(4-hydroxyphenyl)heptane
3,3-bis(3-methyl-4-hydroxyphenyl)hexane
3,3-bis(3,5-dibromo-4-hydroxyphenyl)hexane
2,2-bis(3,5-difluoro-4-hydroxyphenyl)butane
2,2-bis(4hydroxyphenyl)-propane(Bis A)
1,1-bis(3-methyl-4-hydroxyphenyl)ethane
1,1-bis(4-hydroxyphenyl)methane.

Another group of dihydric aromatic compounds useful in the practice of the present invention include the dihydroxyl diphenyl sulfoxides such as for example:
bis(3,5-diisopropyl-4-hydroxyphenyl)sulfoxide
bis(3-methyl-5-ethyl-4-hydroxyphenyl)sulfoxide
bis(3,5-dibromo-4-hydroxyphenyl)sulfoxide
bis(3,5-dimethyl-4-hydroxyphenyl)sulfoxide
bis(3-methyl-4-hydroxyphenyl)sulfoxide
bis(4-hydroxyphenyl)sulfoxide.

Another group of dihydric aromatic compounds which may be used in the practice of the invention includes the dihydroxyaryl sulfones such as, for example:
bis(3,5-diisopropyl-4-hydroxyphenyl)sulfone
bis(3,5-methyl-5-ethyl-4-hydroxyphenyl)sulfone
bis(3-chloro-4-hydroxyphenyl)sulfone
bis(3,5-dibromo-4-hydroxyphenyl)sulfone
bis(3,5-dimethyl-4-hydroxyphenyl)sulfone
bis(3-methyl-4-hydroxyphenyl)sulfone
bis(4-hydroxyphenyl)sulfone.

Another group of dihydric aromatic compounds useful in the practice of the invention includes the dihydroxydiphenyls:
3,3',5,5'-tetrabromo-4-4'-dihydroxydiphenyl
3,3'-dichloro-4,4'-dihydroxydiphenyl
3,3'-diethyl-4,4'-dihydroxydiphenyl
3,3'-dimethyl-4,4'-dihydroxydiphenyl
p,p'-dihydroxydiphenyl.

Another group of dihydric aromatic compounds which may be used in the practice of the invention includes the dihydric phenol ethers:
bis(3-chloro-5-methyl-4-hydroxyphenyl)ether
bis(3,5-dibromo-4-hydroxyphenyl)ether
bis(3,5-dichloro-4-hydroxyphenyl)ether
bis(3-ethyl-4-hydroxyphenyl)ether
bis(3-methyl-4-hydroxyphenyl)ether Other dihydric aromatic compounds of interest include the phthalein type bisphenols which are disclosed in U.S. Pat. Nos. 3,035,021; 3,036,036; 3,036,037; 3,036,038; and 3,036,039.

It is, of course, possible to employ a mixture of two or more different dihydric aromatic compounds in preparing the thermoplastic carbamate polymers of the invention.

Examples of known carbonate compounds which are useful in this invention are

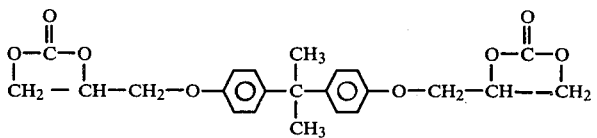

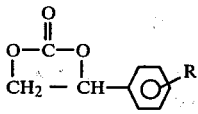

R is aryl or alkyl groups
R' is the same or different aryl or alkyl groups.

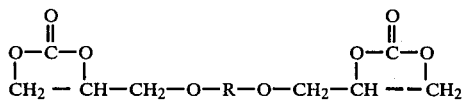

R is phenylene, —(CH$_2$)$_{\overline{n}}$, where n is 1 to 10.

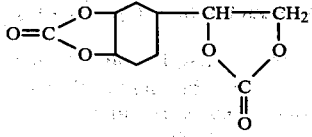

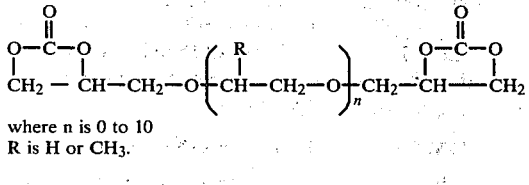

where n is 1 to 10.

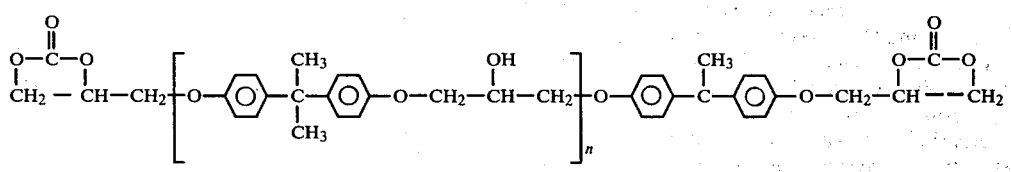

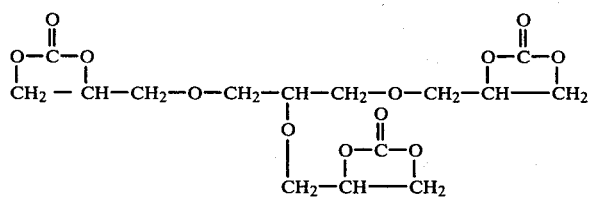

Suitable organophosphorous compounds useful in this invention are exemplified by the following formulas:

$R_1$-P(O$R_2$)O$R_3$  I.

$R_1$O-P(O$R_2$)O$R_3$  II.

$R_3$O($R_2$O)P-$R_4$-P(O$R_2$)O$R_3$  III.

where
$R_1$, $R_2$, $R_3$ are selected from the group consisting of alkyl, cycloalkyl, aralkyl, and alkaryl radicals having 1 to 10 carbon atoms;
$R_4$ is an alkylene, cycloalkylene or an arylidene group having 1–12 carbon atoms.
Examples of compounds within the scope of the foregoing formulas are:
tetrakis (2,4-ditertiarybutylphenyl) 4,4'-biphenylylenediphosphonite,
tris(2,4-di-tertiary-butylphenyl)phosphite, diphenyl benzene phosphonite,
dinonylphenyl benzene phosphonite,
didecyl benzene phosphonite,
di(4-tertiary butyl phenyl) 2 nonylphenyl phosphite,
octyl di(4-tertiary butyl phenyl) phosphite,
diisopropyl phenyl phosphite,
butyl diphenyl phosphite,
didecyl phenyl phosphite,
tris(4-tertiary butyl phenyl) phosphite,
tris phenyl phosphite, and
tris octyl phosphite.

EXAMPLE 1

(DB 22872 pg. 4 & 10)

To 908 grams of a 2,2-bis(4-hydroxyphenyl)propane (Bisphenol-A) polycarbonate resin was added the following solutions of additives in 100 ml of acetone.
1. 0.908 grams of tetrakis-(2,4-di-tert-butylphenyl)-4,4'-biphenylylenediphosphonite. (Control B).

2. 1.816 grams of 3,3'-isopropylidene bis(p-phenyleneoxy) di-1,2-carbonato propane. (Control C.)
3. The combination of No. 1 and No. 2. (Example 1)

The formulated powder was dried in a vacuum oven at 125° C. for approximately 16 hours. The dried powder is extruded at 600° F. into a strand which is comminuted into pellets. A portion of the sample is molded at 575° F. into optical test discs two inches in diameter by one-eighth inch in thickness. As a control, an unformulated sample of the same lot of polycarbonate powder is taken through the same procedures. The discs are tested for yellowness in accordance with ASTM Method D-1925. The remainder of the sample is reextruded @ 600° F. into a strand and comminuted into pellets for two additional runs. This is again followed by making of the samples into test discs at 575° F. The samples are then re-tested for yellowness.

All additive amounts in Table I are based on the weight of the polycarbonate resin. In each case, the Yellowness Index Test is run at room temperature. The results are shown in Table I:

TABLE I

| RUNS WITH POLYCARBONATE | Yellowness Index of Test Discs | | |
|---|---|---|---|
| | After 1 Sample Extrusion | After 3 Sample Extrusions | % Increase |
| Control A (no additives) | 5.2 | 9.0 | 73.07 |
| Control B | | | |
| 1000 ppm tetrakis (2,4-di-tertbutylphenyl)4,4'-biphenylylenediphosphonite with PC | 3.3 | 5.7 | 42.1 |
| Control C | | | |
| 2000 ppm 3,3'-Isopropylidene bis(p-phenyleneoxy)di-1,2-carbonato propane with PC | 4.0 | 6.2 | 35.4 |
| Example 1 (with both additives) | 3.4 | 4.5 | 24.4 |

EXAMPLE 2
(DB 22872 pg. 4 & 10)

Example 1 was repeated except that 0.2% of 1,2-carbonato-3-toloxypropane is employed in place of the dicarbonate. The samples were subjected to ASTM test method D-1003 for determining light transmission of the sample. The higher the percent light transmittance, the better is the clarity of the sample. The results are shown in Table II:

TABLE II

| RUNS WITH POLYCARBONATE | % Light Transmission of Test Discs | | |
|---|---|---|---|
| | After 1 Sample Extrusion | After 3 Sample Extrusions | % Decrease |
| Control D | | | |
| 100 ppm tetrakis (2,4-di-tert-butylphenyl)4,4'-biphenylylenediphosphonite with PC | 88.7 | 86.1 | 2.93 |
| Control E | | | |
| 2000 ppm 1,2-carbonato-3-toloxypropane with PC | 88.9 | 85.6 | 3.71 |
| Example 2 (with both additives) | 89.1 | 87.5 | 1.79 |

EXAMPLE 3
(DB 22872 pg. 4 & 10)

Example 2 was repeated except that 0.1% or 1000 ppm tris(2,4-di-t-butylphenyl)phosphite is employed in place of the diphosphonite. The results are shown in Table III:

TABLE III

| RUNS WITH POLYCARBONATE | % Light Transmission of Test Discs | | |
|---|---|---|---|
| | After 1 Sample Extrusion | After 3 Sample Extrusions | % Decrease |
| Control F | | | |
| 1000 ppm of tris(2,4-di-t-butylphenyl)phosphite | 89.1 | 86.5 | 2.91 |
| Control E | | | |
| 2000 ppm 1,2-carbonato-3-toloxypropane with PC | 88.9 | 85.6 | 3.71 |
| Example 3 (with both additives) | 88.7 | 87.3 | 1.57 |

EXAMPLE 4

To 454 grams of a 2,2-bis(4-hydroxyphenyl) propane (Bisphenol-A) polycarbonate resin is applied any of the following solutions of additives in 100 ml of acetone:
1. 0.454 gm of tetrakis-(2,4-di-tert-butylphenyl)4,4'-biphenylylenediphosphonite. (Control F).
2. 0.908 gm of 3,4-carbonate-cyclohexyl-methyl-3,4-carbonatecyclohexane carboxylate. (Control G).
3. The combination of No. 1 and No. 2. (Example 4).

The formulated resin is dried in a vacuum oven at 250 F. for approximately 16 hours. The dried resin is extruded at 575 F. into a strand which is comminuted into pellets. A portion of the sample is molded at 575 F. into optical test discs two inches in diameter by one-eighth inch in thickness. As a control, an unformulated sample of the same resin is taken through the same procedure. The discs are tested for yellowness in accordance with ASTM Method D-1925. After oven aging for 500 hours at 284 F., the samples are retested for yellowness.

The amount of the additives used is based on the weight of the polycarbonate resin. In each case, the Yellowness Index Test is run at room temperature. The results are as follows:

TABLE IV

| | Yellowness Index of Test Discs | |
|---|---|---|
| | Initial | After 500 hrs. at 284° F. |
| Control F | | |
| 0.1% tetrakis-(2,4-di-tert-butylphenyl)4,4'-biphenylylene-diphosphonite | 4.1 | 12.5 |
| Control G | | |
| 0.1% 3,4-carbonato-cyclohexylmethyl-3,4-carbonato cyclohexane carboxylate | 7.3 | 25.8 |
| Example 4 (with both additives) | 3.4 | 10.9 |
| Control H (no additive) | 5.8 | 18.2 |

We claim:
1. A heat stabilized aromatic polycarbonate composition resistant to yellowing which comprises an aromatic polycarbonate blended with 100 to 10,000 parts per million of a cyclic carbonate compound having a boiling point greater than about 250° C. and 100 to 10,000 parts per million of an organophosphorous compound selected from neutral phosphites and phosphonites.

2. The composition as set forth in claim 1 wherin the amount of carbonate compound ranges from 1000 to 3,000 parts per million.

3. The composition as set forth in claim 1 wherein the amount of organophosphorous compound ranges from 500 to 3,000 parts per million.

4. The composition as set forth in claim 1 wherein the carbonate compound is selected from the group consisting of
   (a) organic compounds having a single carbonate group,
   (b) organic compounds having two carbonate groups, or
   (c) organic compounds having three or more carbonate groups.

5. The composition as set forth in claim 1 wherein the carbonato compound is 1,2-carbonate-3-toloxypropane.

6. The composition as set forth in claim 1 wherein the carbonate compound is 3,3'-isopropylidene bis(p-phenyleneoxy)di-1,2-carbonato propane.

7. The composition as set forth in claim 1 wherein the carbonato compound is 3,4-carbonato cyclohexylmethyl-3,4-carbonato-cyclohexane carboxylate.

8. The composition as set forth in claim 1 wherein the organophosphorous compound is tetrakis (2,4-ditertiarybutylphenyl)4,4'-biphenylylene diphosphonite.

9. The composition as set forth in claim 1 wherein the organophosphorous compound is tris(2,4-di-tertiarybutylphenyl)phosphite.

* * * * *

UNITED STATES PATENT AND TRADEMARK OFFICE
CERTIFICATE OF CORRECTION

PATENT NO. : 4,407,995
DATED : October 4, 1983
INVENTOR(S) : Kevin F. Dick

It is certified that error appears in the above—identified patent and that said Letters Patent is hereby corrected as shown below:

Col. 2, line 1, "oxylalkyl" should be --oxyalkyl--.

Col. 2, line 20, "(4hydroxyphenyl)-propane(Bis A)" should be --(4-hydroxyphenyl)propane(Bis A)--.

Col. 2, line 67, "carbamate" should be --carbonate--.

Col. 3, after first formula insert

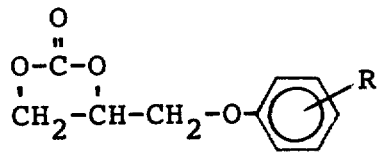

R is H or an alkyl group of 1-4 carbons.

Col. 3, after second formula insert

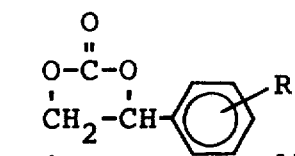

R is H or an alkyl group of 1-4 carbons.

UNITED STATES PATENT AND TRADEMARK OFFICE
CERTIFICATE OF CORRECTION

PATENT NO. : 4,407,995
DATED : October 4, 1983
INVENTOR(S) : Kevin F. Dick

It is certified that error appears in the above—identified patent and that said Letters Patent is hereby corrected as shown below:

Col. 3, after third formula insert

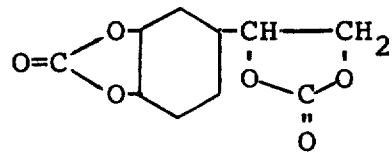

Col. 3, after fourth formula insert

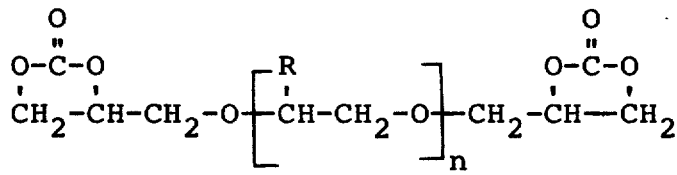

where n is 0 to 10
R is H or $CH_3$.

Col. 4, delete first four formulae together with the definitions.

Col. 5, line 11, "procedures." should be --procedure.--.

UNITED STATES PATENT AND TRADEMARK OFFICE
CERTIFICATE OF CORRECTION

PATENT NO. : 4,407,995

DATED : October 4, 1983

INVENTOR(S) : Kevin F. Dick

It is certified that error appears in the above—identified patent and that said Letters Patent is hereby corrected as shown below:

Col. 7, line 6, "wherin" should read --wherein--.

Signed and Sealed this

Tenth Day of July 1984

[SEAL]

Attest:

GERALD J. MOSSINGHOFF

Attesting Officer

Commissioner of Patents and Trademarks